United States Patent [19]
Jeambey

[11] 3,811,707
[45] May 21, 1974

[54] FIFTH WHEEL TRAILER AND PRIME MOVER THEREFOR

[76] Inventor: Calhoun G. Jeambey, 7013 Palm Dr., Des Moines, Iowa 50322

[22] Filed: Aug. 7, 1972

[21] Appl. No.: 278,604

[52] U.S. Cl............................................ 280/423 R
[51] Int. Cl............................................. B62d 53/00
[58] Field of Search............ 280/423, 424; 296/23 R

[56] References Cited
UNITED STATES PATENTS

| | | | |
|---|---|---|---|
| 2,970,004 | 1/1961 | Ratner et al. | 280/423 R X |
| 3,392,992 | 6/1968 | Baker et al. | 280/423 R |
| 2,315,688 | 4/1943 | Crawford | 280/424 R |
| 2,871,026 | 1/1959 | Hotchkiss | 280/423 R |

Primary Examiner—Leo Friaglia
Assistant Examiner—Randall A. Schrecengost
Attorney, Agent, or Firm—Zarley, McKee & Thomte

[57] ABSTRACT

A fifth wheel trailer and prime mover therefor is disclosed which substantially increases the head room in the living compartment at the forward end of the trailer. The living compartment at the forward end of the trailer has a floor structure at the lower portion thereof which is supported by a substantially shallow frame structure. The prime mover has a fifth wheel hitch mounted on the frame of the prime mover. The frame structure of the trailer extends closely over the rearward end of the prime mover frame.

3 Claims, 4 Drawing Figures

PATENTED MAY 21 1974 3,811,707

FIFTH WHEEL TRAILER AND PRIME MOVER THEREFOR

Conventional fifth wheel recreational vehicles such as trailers or the like generally comprise a main living area at the rearward end of the trailer and an elevated bedroom area at the forward end of the trailer. The elevated bedroom area is necessitated by the fact that the trailer must be designed to enable it to be connected to a fifth wheel hitch assembly mounted on the floor of a conventional pick-up truck box. The floor of the truck box is positioned some distance above the truck frame. The fifth wheel is normally secured to the floor of the pick-up box and it must be positioned some distance thereabove since the box has side walls having the upper ends positioned some distance above the floor. In other words, the fifth wheel must be positioned above the floor of the box so that the frame structure at the forward end of the trailer will clear the upper ends of the box side walls. The relationship just described results in the floor structure of the forward portion of the trailer being elevated approximately two to three feet above the floor structure of the rearward end of the trailer. Thus, the presently available fifth wheel recreational vehicles suffer from a lack of head room in the forward areas thereof.

Therefore, it is a principal object of this invention to provide an improved fifth wheel recreational vehicle.

A further object of this invention is to provide an improved fifth wheel recreational trailer having increased head room in the forward area thereof.

A further object of this invention is to provide a fifth wheel recerational vehicle and prime mover therefor which permits the frame structure at the forward end of the trailer to be closely positioned over the prime mover frame.

A further object of this invention is to provide a fifth wheel recreational trailer and prime mover therefor having improved aesthetic qualities.

A further object of this invention is to provide a fifth wheel recreational trailer which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illsutrated in the accompanying drawings, in which:

Figure 1:
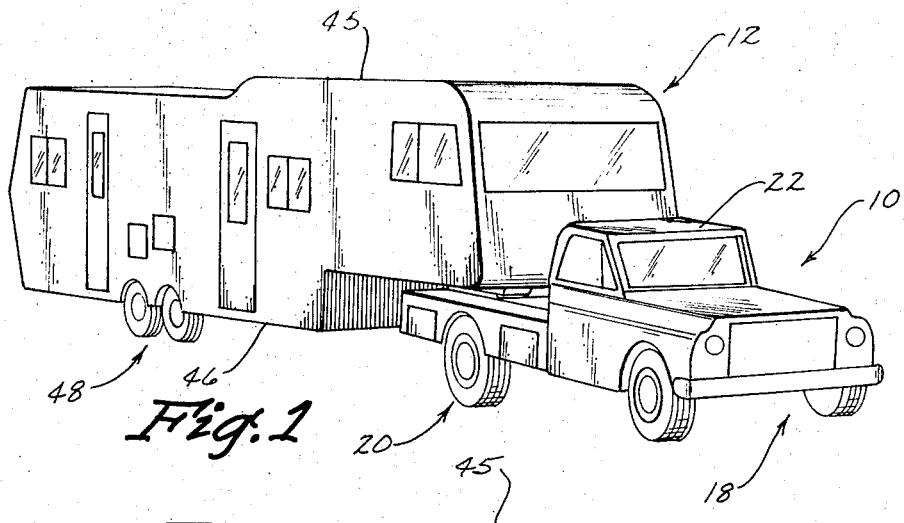
FIG. 1 is a front perspective view of the fifth wheel recreational trailer and the prime mover therefor.
Figure 2:
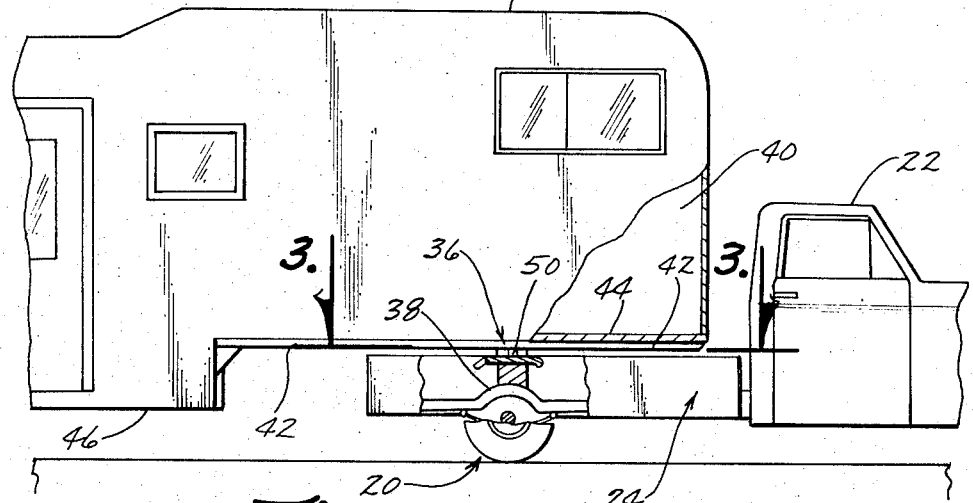
FIG. 2 is a side view of the trailer and prime mover with portions thereof cut away to more fully illustrate the invention.
Figures 3, 4:
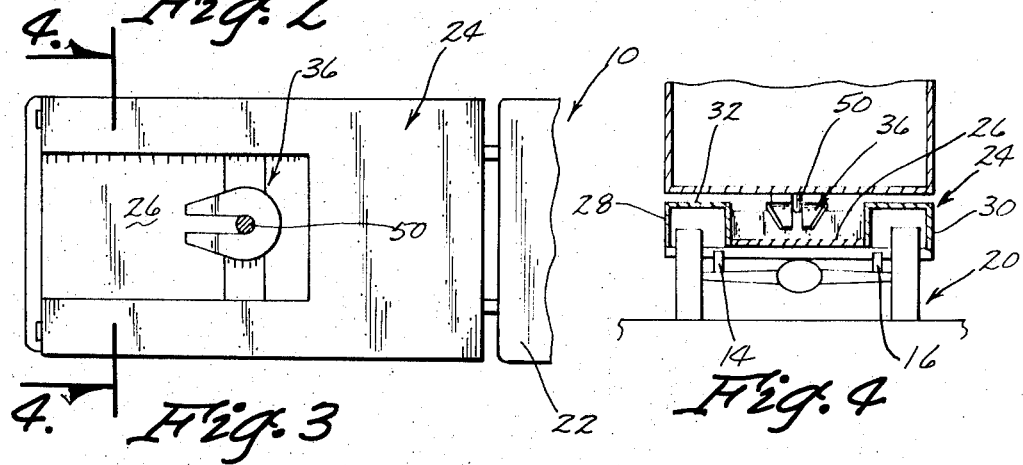
FIG. 3 is a sectional view seen along lines 3—3 of FIG. 2.
FIG. 4 is a sectional view seen along lines 4—4 of FIG. 3.

The numeral 10 generally refers to the prime mover such as a pick-up truck while the numeral 12 generally refers to the recreational vehicle or trailer. Truck 10 includes a pair of longitudinally extending frame members 14 and 16 supported by a conventional front wheel assembly 18 and a conventional rear wheel assembly 20. Truck 10 includes a cab 22 at the forward end thereof and a box 24 at the rearward end thereof. Box 24 is secured to the frame members 14 and 16 by any convenient means. Box 24 includes a recessed floor portion 26 formed in the central rearward end thereof. As seen in FIG. 4, floor portion 26 is positioned closely adjacent the frame members 14 and 16. As also seen in FIG. 4, the side walls 28 and 30 of the box 24 have a height which is substantially less than the side walls of conventional pick-up truck boxes. The upper portions 32 and 34 of the side walls 28 and 30 respectively are positioned closely over the tops of the rear wheels of the truck.

The numeral 36 refers to a conventional fifth wheel which is secured to the raised portion 38 of the floor portion 26 with the upper surface thereof being positioned just slightly above the plane of the upper ends 32 and 34 of the side walls 28 and 30 respectively.

Trailer 12 is provided with a living compartment 40 at the forward end thereof having a substantially shallow frame structure 42 upon which is mounted the floor 44. Trailer 12 includes an elevated roof structure 45 at the forward end thereof which is elevated with respect to the remaining portion of the roof of the trailer so as to provide increased head room within the living compartment 40. The numeral 46 generally refers to the frame structure of the trailer rearwardly of the frame structure 42. Frame structure 46 is positioned approximately one foot below the plane of the frame structure 42. Frame structure 46 is supported by a conventional wheel assembly 48. Trailer 12 has a kingpin 50 secured to the frame structure 42 which extends downwardly therefrom for connection to the fifth wheel 36 in conventional fashion as viewed in FIG. 4. Thus, when the trailer 12 is connected to the fifth wheel 36 of truck 10, the frame structure 42 and hence floor 44 is positioned closely above the truck frame so that the floor 44 of the living compartment 40 is substantially lower with respect to conventional fifth wheel trailers so as to provide increased head room in the living compartment 40. The configuration of the box 24 is such that the fifth wheel 36 is positioned closely above the truck frame and is designed so as to have aesthetic qualities.

Thus it can be seen that a fifth wheel recreational trailer and prime mover therefor has been provided which substantially increases the head room in the living compartment at the forward end of the trailer. It can be seen that the invention accomplishes at least all of its stated objectives.

I claim:

1. In combination,
a prime mover having a wheel mounted frame with forward and rearward ends, said prime mover having a box at the rearward end thereof, said box comprising,
a floor portion, side walls and an upper portion positioned closely over the tops of the rear wheels of the prime mover, said floor portion having a recessed area in the central rearward end thereof; and
a recreational vehicle having at least one living compartment in the forward end thereof;
said living compartment having a floor structure at the lower portion thereof,
a substantially shallow frame structure, said frame structure extending closely over the rearward end of said wheel mounted frame; and hitch means comprising a fifth wheel being secured to the floor of said box within the recessed area thereof, and a kingpin extending downwardly from the frame structure of said recreation vehicle for pivotal connection to said fifth wheel.

2. The combination of claim 1 wherein said vehicle has a second living compartment rearwardly of said one living compartment, said second living compartment having a floor structure at the lower portion thereof which dwells in a plane closely below the plane of the floor structure of said one living compartment.

3. The combination of claim 1 wherein said vehicle has an elevated roof structure over said one living compartment so that the head room in said one living compartment is substantially equal to the head room in said second living compartment.

* * * * *